US005813283A

United States Patent [19]

Chen et al.

[11] Patent Number: 5,813,283

[45] Date of Patent: Sep. 29, 1998

[54] VERTICAL/HORIZONTAL SPINDLE HEAD FOR MACHINE TOOLS

[75] Inventors: Lei-Yi Chen, Chutung; Shao-Yu Hsu, Hsinchu; Jinn-Fa Wu, Baoshan, all of Taiwan

[73] Assignee: Industrial Technology Research Institute, Chutung, Taiwan

[21] Appl. No.: 666,929

[22] Filed: Jun. 20, 1996

[51] Int. Cl.[6] .......... F16H 1/14

[52] U.S. Cl. .......... 74/417; 74/405

[58] Field of Search .......... 74/417, 405; 192/85 CA

[56] References Cited

U.S. PATENT DOCUMENTS

| | | | |
|---|---|---|---|
| 4,579,016 | 4/1986 | Soroka et al. | 74/417 X |
| 4,683,772 | 8/1987 | Colimitra | 74/417 X |
| 4,841,795 | 6/1989 | Obrietan | 74/417 O |
| 4,953,411 | 9/1990 | Coenen et al. | 74/417 X |
| 5,501,636 | 3/1996 | Janke et al. | 74/417 X |

*Primary Examiner*—Charles A. Marmor
*Assistant Examiner*—David M. Fenstermacher
*Attorney, Agent, or Firm*—Ladas & Parry

[57] ABSTRACT

A vertical/horizontal spindle head for machine tools having a main transmission shaft with a first bevel gear secured thereon, a lower rotatable housing having a bevel gear axle secured therein, an upper seat having a push/pull apparatus for axially moving the lower rotatable housing relative to the upper seat, a main shaft having a second bevel gear secured thereon, third and fourth bevel gears coaxially arranged on the bevel gear axle, and a curved coupling between the upper seat and the lower rotatable housing. Between the third and fourth bevel gears are springs to move the third bevel gear axially and maintain it in engagement with the first bevel gear. A slidable spline device is provided between the third bevel gear and the bevel gear axle. The slidable spline device is disengaged in a first position where the curved coupling is coupled and is engaged in a second position when the lower rotatable housing is pushed away from the upper seat by the push/pull apparatus and the curved coupling is uncoupled. In the first position, the main transmission shaft can rotate the main shaft through the first, third, fourth and second bevel gears. In the second position, the lower rotatable housing can be rotated to a desired angular position by the main transmission shaft, through the first bevel gear, the third bevel gear and the slidable spline device.

4 Claims, 6 Drawing Sheets

F
1
2
3
5
51
8
11
12
21
B
81
82
84
841
85
86
83
S
831
84
832
833
41
4
42
6
71
61
7
B

VERTICAL/HORIZONTAL SPINDLE HEAD FOR MACHINE TOOLS

FIELD OF THE INVENTION

The present invention relates to a vertical/horizontal spindle head for machine tools; specifically to one that utilizes a push/pull apparatus and a slidable spline device, in association with the rotation of a main transmission shaft, to change the spindle head to either a vertical or a horizontal position.

BACKGROUND OF THE INVENTION

"The expression vertical/horizontal spindle head for machine tools" refers to a spindle head for machine tools that is able to change to either a vertical or horizontal position relative to a transmission shaft on facilitate a vertical and horizontal machining operation a work piece as required. To associate with an index rotatable work table, the vertical/horizontal machining center can cut at five faces of a workpiece in one setting. Therefore, a milling machine equipped with a vertical/horizontal spindle head will considerably increase its added value.

As shown in FIGS. 1 and 2, a conventional vertical/horizontal spindle head requires the operator to manually loosen the connection bolts in order to rotate the spindle head to a desired position. Such a conventional spindle head not only is time-consuming in operation, but also is not compatible with CNC automatic machine tools.

In order to be compatible with CNC machine tools, a vertical/horizontal spindle head must be able to automatically change its angular positions. The most commonly known manner is to loosen a curved coupling disposed on a 45° inclined surface, and then rotate the spindle head to a desired angular position by means of a hydraulic motor a plurality of and gears disposed on the 45° inclined surface (see FIG. 3). Then, the spindle head is pulled by a hydraulic cylinder for tightening and engaging the curved coupling. Such a design is undesirable because it requires an additional hydraulic motor to drive the spindle head. This not only will increase the cost of the machine but also because of the limited space available, it is difficult to fit the hydraulic motor into the machine.

U.S. Pat. No. 4,841,795 issued to Gioacchino Obrietan in 1989 discloses a "Double-Rotatable Universal Head for Machine Tools" (see FIG. 4). The Obrietan invention utilizes a head carrier interposed between the spindle head and a slide in order to transmit torque from the machine tool drive shaft to the spindle. However, before commencing with the rotation, the cast piece and the drive shaft must be secured. In addition, because of the force undertaken by the spindle under this configuration, this may lead to premature fatigue of the spindle bearing. Since the angular positions of the spindle head of the Obrietan invention are secured through hydraulic force instead of a curved coupling, the accuracy of the positions is difficult to maintain.

SUMMARY OF THE INVENTION

An object of the present invention is to provide a dependable and structurally simple vertical/horizontal spindle head that utilizes the rotation of a main transmission shaft in association with a slidable spline device to rotate the spindle head which is advantageous in providing smooth operation at relatively low cost and capable of installation in the limited space available in machine tools.

It is also an object of the present invention to provide a vertical/horizontal spindle head able to accurately rotate to the desired angular positions.

It is yet another object of the present invention to provide a vertical/horizontal spindle head so that bevel gears are not disengaged from one another during the changing of the angular positions of the spindle head to avoid wear and tear on the gears or problems related to gear clearance.

The spindle head of the present invention comprises a main transmission shaft, a first bevel gear, a lower rotatable housing, an upper seat, a bevel gear axle, a main shaft, a second bevel gear, a third bevel gear, a fourth bevel gear, a curved coupling, and a push/pull apparatus. The first bevel gear is coaxially secured on one end of the main transmission shaft. The main shaft is circumferentially and co-axially secured with the second bevel gear and is pivotally arranged within the lower rotatable housing. The bevel gear axle is firmly secured within the lower rotatable housing and forms, an angle of 135° with the main transmission shaft and an angle of 45° with the main shaft, The third and fourth bevel gears are rotatably and co-axially arranged on the bevel gear axle and are biased by a compressed spring disposed therebetween, so that the third and fourth bevel gears respectively engage with the corresponding first and second bevel gears. The upper seat is mounted on a body of the machine tool and is concentric with the bevel gear axle. The push/pull apparatus is arranged on the upper seat for pushing/pulling the lower rotatable housing in an axial direction of the bevel gear axle, between first and second positions. The curved coupling includes an upper and lower curved rings respectively mounted on the upper seat and the lower rotatable housing. The upper and lower curved rings engage with or disengage from each other when the lower rotatable housing is in the first or second position. A slidable spline device is provided between the third bevel gear and the bevel gear axle. The slide spline device is disengaged or engaged when the lower rotatable housing is in the first or the second position. When the push/pull apparatus pulls the lower rotatable housing into the first position, a rotational force can be transferred, through the main transmission shaft, the first, third, fourth and second bevel gears to drive the main shaft in rotation. When the push/pull apparatus pushes the lower rotatable housing into the second position, the curved coupling is disengaged, the third bevel gear is maintained in contact with the first bevel gear by means of the biased spring disposed between the third and fourth bevel gears, and the slidable spline device is so engaged that the bevel gear axle engages the third bevel gear, whereby the lower rotatable housing can be changed to a vertical or horizontal position by using the rotational force through the main transmission shaft.

These and other objects, advantages and features of the present invention will become apparent to those skilled in the art from the following detailed description of the preferred embodiment, when read in light of the accompanying drawings.

DETAILED DESCRIPTION OF THE INVENTION

Figure 2:
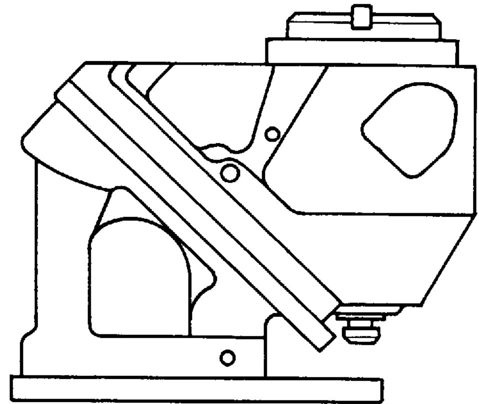
FIG. 2 is another schematic view showing a conventional and manually operated vertical/horizontal spindle head in which the main shaft thereof is in a horizontal position.
Figure 1:
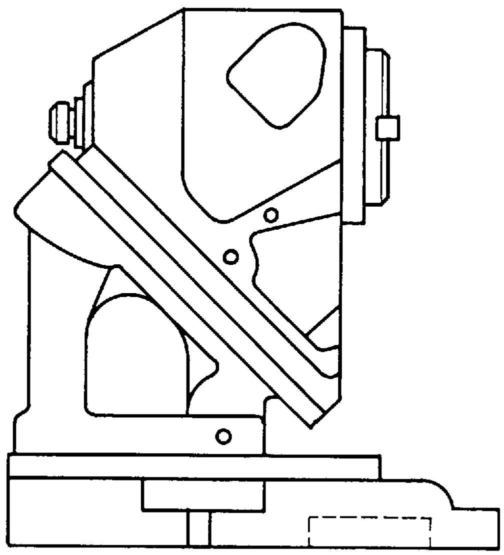
FIG. 1 is a schematic view showing a conventional and manually operated vertical/horizontal dual spindle head in which the main shaft thereof is in a vertical position.
Figure 3:
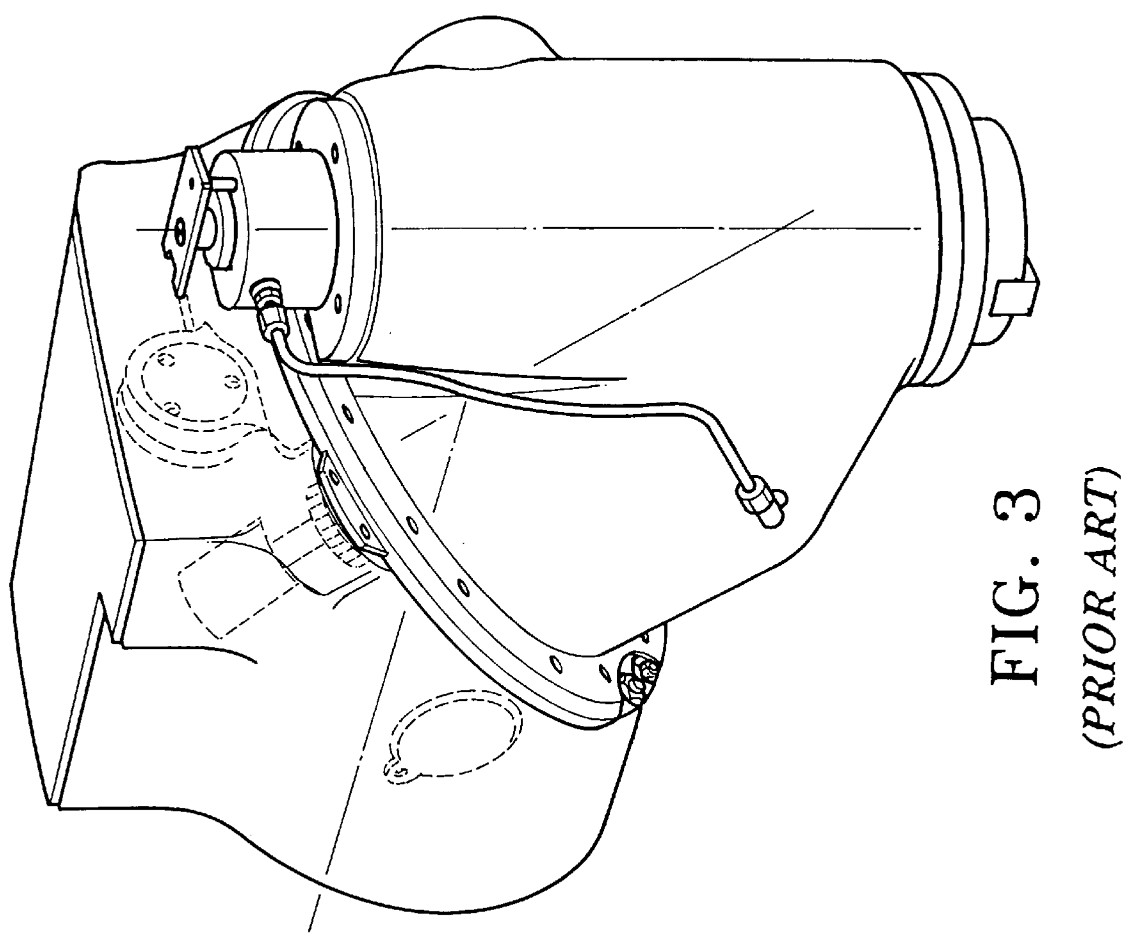
FIG. 3 is a perspective view showing a conventional automatic vertical/horizontal spindle head.
Figure 4:
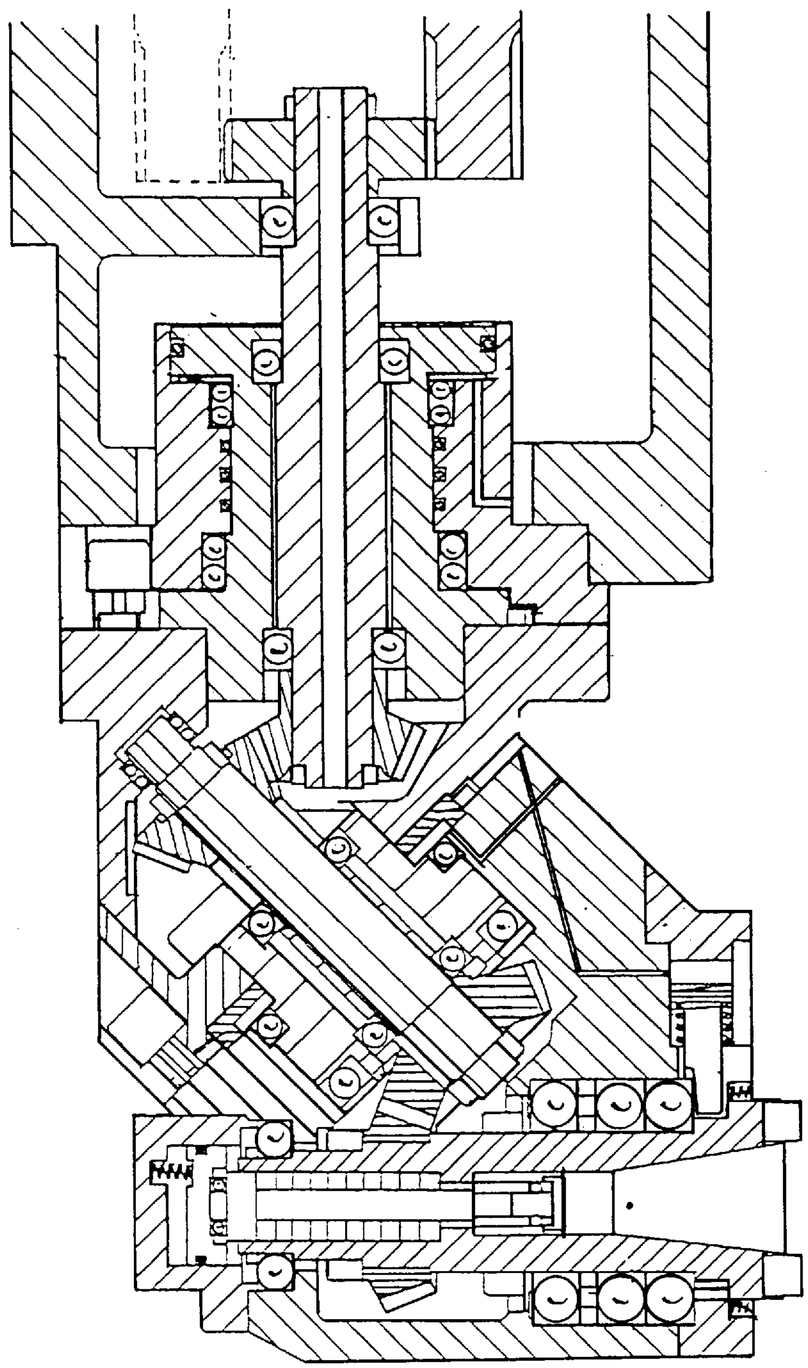
FIG. 4 is a sectionally schematic view of U.S. Pat. No. 4,841,795.
Figure 5:
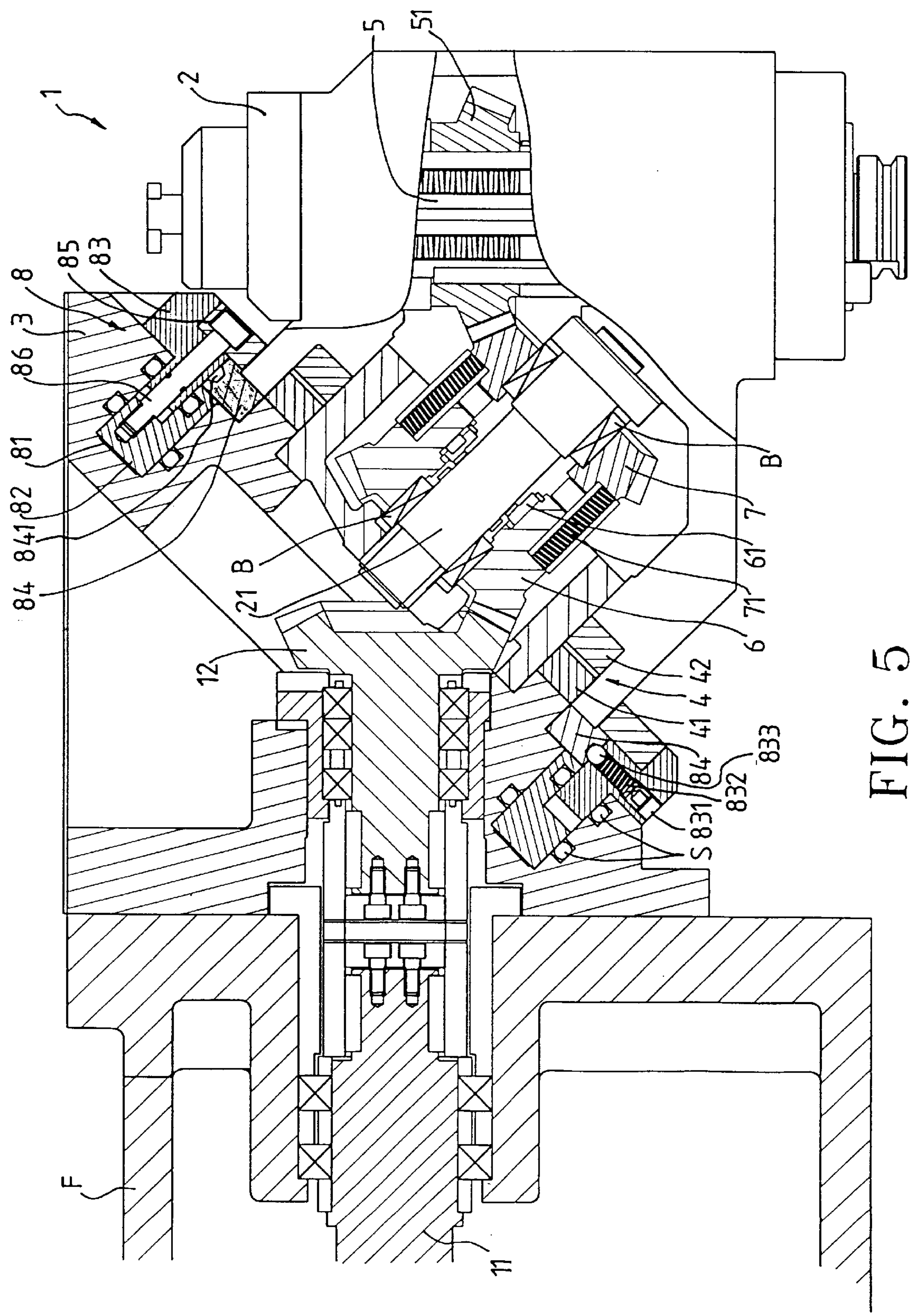
FIG. 5 is a schematic, longitudinal sectional view of one preferred embodiment of a vertical/horizontal dual spindle head in accordance with the present invention showing that the lower rotatable housing is pulled by the hydraulic piston to the first position where the lower rotatable housing is closest to the upper seat, the curved coupling being engaged and the slidable spline device being disengaged.
Figure 6:
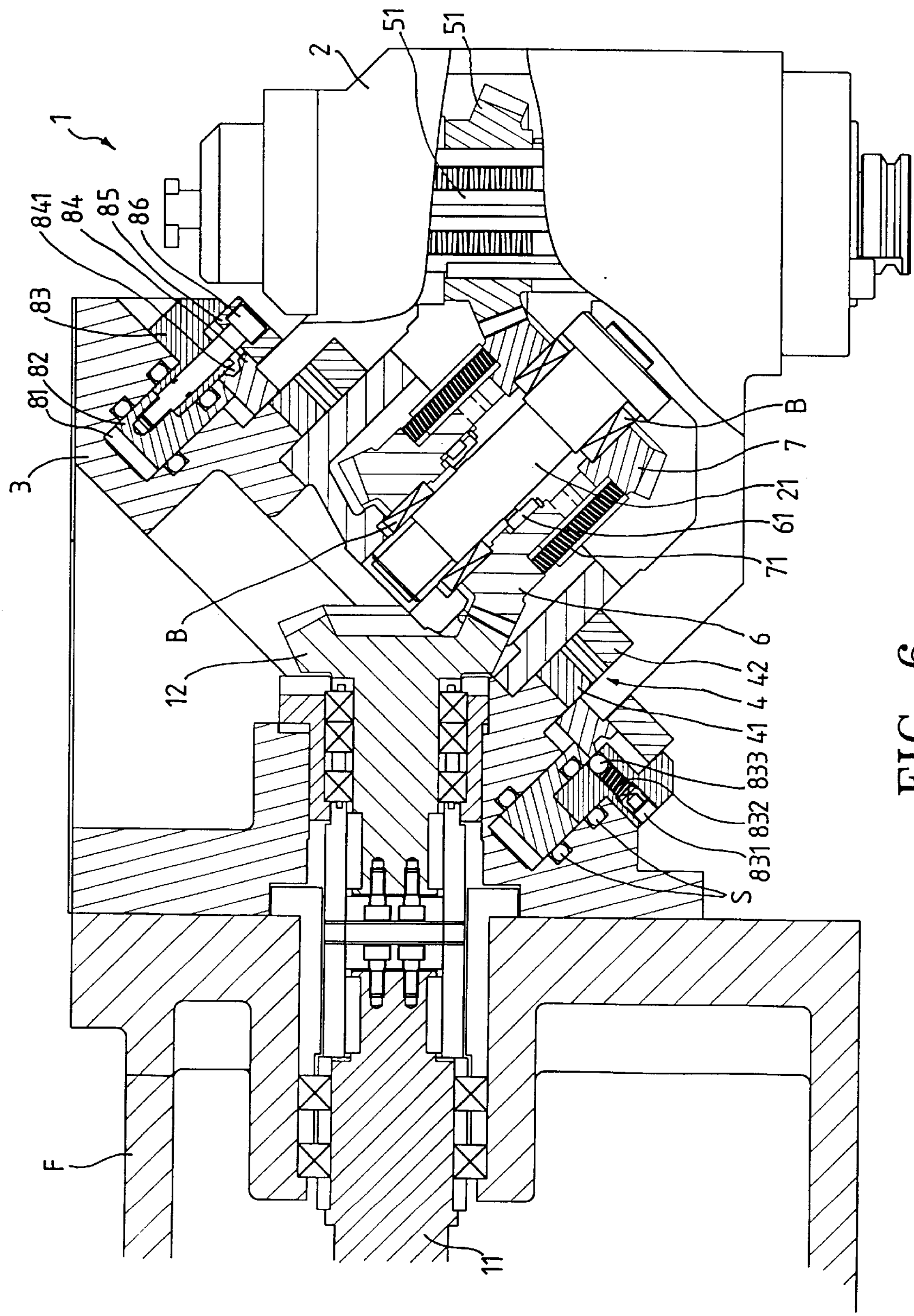
FIG. 6 is another schematic, longitudinal sectional view of the preferred embodiment of the present invention showing that the lower rotatable housing pushed by the hydraulic piston to the second position where the lower rotatable housing is farthest from the upper seat, the curved coupling being disengaged and the slidable spline device being engaged.

Referring to FIGS. 5 and 6, the vertical/horizontal spindle head (1) of the subject invention mainly includes a main transmission shaft (11), a first bevel gear (12), a lower rotatable housing (2), a bevel gear axle (21), an upper seat (3), a curved coupling (4), a main shaft (5), a second bevel gear (51), a third bevel gear (6) and a fourth bevel gear (7), a slidable spline device (61), a compressed spring (71), and a push/pull apparatus (8) for pushing/pulling lower housing. The main transmission shaft (11) includes two ends and is pivotally arranged within a body of a machine tool (F). The first bevel gear (12) is coaxially and firmly secured on one end of the main transmission shaft (11).

The main shaft (5) is pivoted within the lower rotatable housing (2). The second bevel gear (51) is coaxially secured on the main shaft (5). The bevel gear axle (21) is firmly secured within the lower rotatable housing (2) to form angles of 135° and 45° with said main transmission shaft (11) and said main shaft (5) respectively. The third and fourth bevel gears (6)(7) are co-axially and circumferentially mounted on the bevel gear axle (21) with bearings (B). The third and fourth bevel gears (6)(7) rotate together and are biased by the compressed spring (71) disposed therebetween to enable the third bevel gear (6) to slide away from said fourth bevel gear (7) in the axial direction of said bevel gear axle (21), so that the third bevel gear (6) is fourth bevel gear (7) respectively remain in engagement with the corresponding first and second bevel gears (12) (51).

The upper seat (3) is securely positioned on the body of the machine tool (F) is concentric with the bevel gear axle (21). The push/pull apparatus (8) for pushing/pulling the lower housing (2), preferably a hydraulic apparatus, is provided on the upper seat (3), and includes an annular hydraulic cylinder (81), an annular piston (82), an upper gland ring (83), a supporting ring (84), a lower gland ring (85), and a plurality of supporting bolts (86). The annular hydraulic device (81) is concentric with the bevel gear axle (21) and is formed on the upper seat (3).

The annular piston (82) is slidably engaged in the annular hydraulic cylinder (81) and is movable in the axial direction of the bevel gear axle (21).

The upper gland ring (83) is positioned at an opening of said hydraulic cylinder (81) to prevent excessive outward movement of the piston (82). The lower gland ring (85) is concentric with the bevel gear axle (21). The supporting ring (84) is concentric with the bevel gear axle (21) and is arranged between the piston (82) and the lower gland ring (85). One end of each of the supporting bolts (86) is firmly secured on the lower gland ring (85) and the other end is firmly secured on the piston (82) thereby mechanically connecting the lower rotatable housing (2) to the piston (82). Oil seals (S) may be provided between the piston (82) and said annular hydraulic cylinder (81) to prevent oil leakage. The hydraulic push/pull apparatus (8), under the operation of a hydraulic system, is able to pull the lower rotatable housing (2) toward the upper seat (3) in the axial direction of the bevel gear axle (21) to a first position where the lower rotatable housing (2) is closest to the upper seat (3) (see FIG. 5). Alternatively, the push/pull apparatus (8) may also push the lower rotatable housing (2) away from the upper seat (3) in the axial direction of the bevel gear axle (21) to a second position where the lower rotatable housing (2) is farthest from the upper seat (3) (see FIG. 6). The annular supporting ring (84) is formed with an annular groove (841). When in the first position, the upper gland ring (83) is formed with at least one through hole (831) at the place corresponding to the annular groove (841) of the annular supporting ring (84). The through hole (831) receives a compressed spring (832) and a steel ball (833), in which the steel ball (833) is biased by the compressed spring (832) and partially protrudes out of the through holes (831). In association with the annular grooves (841) of the annular supporting ring (84), the steel ball (833) maintains the lower rotatable housing (2) in the first position.

The curved coupling (4) includes an upper curved ring (41) and a lower curved ring (42) correspondingly positioned on the upper seat (3) and the lower rotatable housing (2) respectively. The upper and lower curved rings (41) (42) are coupled and uncoupled as the lower rotatable housing (2) is in the first and second positions respectively.

The slidable spline device (61) is disposed between the third bevel gear (6) and the bevel gear axle (21). When the lower rotatable housing (2) is in the first position, the slidable spline device (61) is disengaged such that the third bevel gear (6) is freely rotatable about the bevel gear axle (21). When the lower rotatable housing (2) is in the second position, the slidable spline device (61) is engaged such that the bevel gear axle (21) rotates together with the third bevel gear (6).

As can be seen from FIG. 5, when the lower rotatable housing (2) is located at the first position, the hydraulic cylinder (81) maintains the piston (82) in the first position. The upper and lower curved ring (41) (42) of the curved coupling (4) are engaged. The third and fourth bevel gears (6) (7) are respectively engaged with the corresponding first and second bevel gears (12) (51) and the slidable spline device (61) is disengaged. Therefore, rotational force transferred from an electric motor (not shown), through the first, third, fourth and second bevel gears (12) (6) (7) (51), can be used to drive the main shaft (5) in rotation.

The coupling of the upper and lower curved rings (41) (42) of the curved coupling (4) are used to prevent relative rotation between the lower rotatable housing (2) and the upper seat (3), so that the desired angular position of the lower rotatable housing (2) can be accurately achieved. The hydraulic cylinder (81) in association with the piston (82), under the operation of a hydraulic system, may maintain the lower rotatable housing (2) in the first position. However, if the hydraulic system malfunctions, the steel ball (833) biased by the compressed spring (832) in association with the annular groove (841) of the annular supporting ring (84) may also effectively maintain the lower rotatable housing (2) in the first position, so as to ensure the safety and security of operation.

Referring to FIG. 6, when the pressure of the hydraulic oil in the hydraulic cylinder (81) pushes the piston (82) outwardly to abut against the upper gland ring (83), the lower rotatable housing (2) moves in the axial direction of the bevel gear axle (21) to the second position where the lower rotatable housing (2) is closest to the upper seat (3). At the second position, the upper and lower curved rings (41) (42) of the curved coupling (4) are disengaged. When the lower rotatable housing (2) moves outwardly, the third bevel gear (6) biased by the compressed spring (71) moves away from the fourth bevel gear (7) and remains engaged with the first bevel gear (12). The axially sliding movement of the third bevel gear, (6) caused by the biased spring (71), moves the slidable spline device (61) to an engaged condition, so that the bevel gear axle (21) can be rotated with the third bevel gear (6). At this time, since the curved coupling is uncoupled and the bevel gear axle (21) fixed in the lower rotatable housing (2) engages the third bevel gear (6) through the slidable spline device (61), the rotational force transferred from the main transmission shaft (11), through the first and third bevel gears (12) (6), may slowly and smoothly rotate the lower rotatable housing (2) to a desired angular position.

Figure 7:
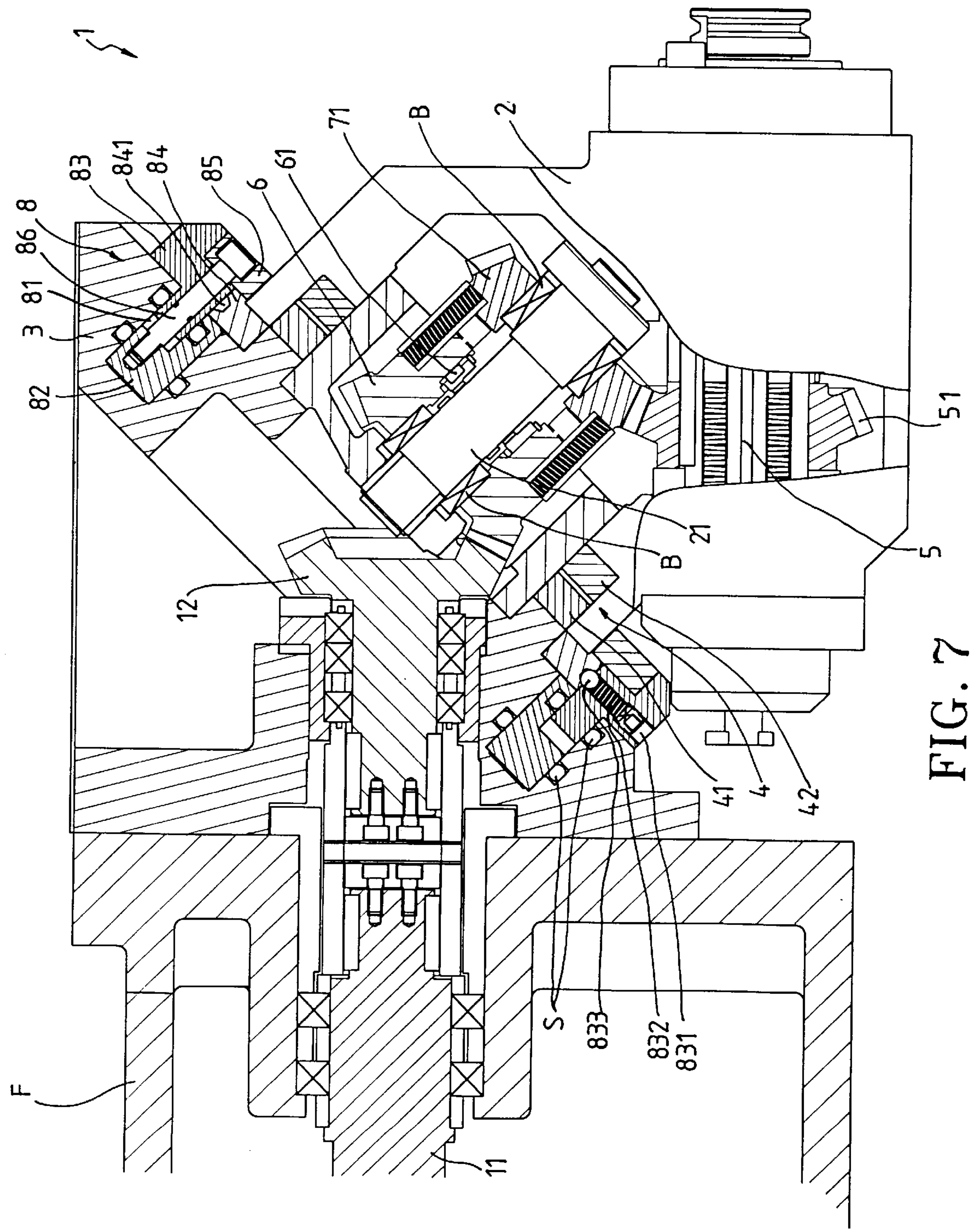
FIG. 7 is a schematic, longitudinal sectional view similar to that of FIG. 6 except that the lower rotatable housing has rotated to the horizontal position and returned to the first position.

When a strategically positioned sensor (not shown) detects that the lower rotatable housing (2) has reached the required angular position (such as the horizontal position shown in FIG. 7), the main transmission shaft (11) ceases rotation. Through the piston (82) and supporting bolts (86), the hydraulic cylinder (81), under operation of hydraulic pressure, pulls the lower rotatable housing (2) back to the first position, so that the upper and lower curved rings (41) (42) of the curved coupling (4) are engaged. And, the third bevel gear (6) is pushed by the first bevel gear (12) and moves toward the fourth bevel gear (7), so that the slidable spline device (61) returns to the disengagement condition. Therefore, rotational force may be transferred through the main transmission shaft (11), the first, third, fourth and fourth bevel gears (12) (6) (7) (51) to drive the main shaft (5) in rotation.

The present invention achieves the objective of changing the required vertical/horizontal position through the transmission of rotational force from said main transmission shaft without using any additional driving apparatus. The result is simplicity in structure that solves the problem with limited space available within a machine tool so as to construct a driving apparatus, which is both dependable and inexpensive.

In addition, during the changing of the vertical/horizontal positions of the main shaft (5), all the bevel gears remain in contact with one another through the use of compressed springs (71) and therefore avoid the problems of wear and tear of the gears and clearance between the gears. Since there are no relative movements among the components, smooth operations are achieved. In addition, if the hydraulic system malfunctions, ball (833) biased by the compressed spring (832) in association with the annular groove (841) of the annular supporting ring (84) is also sufficient to effectively maintain the lower rotatable housing (2) in the first position, so as to ensure safety and security of operation.

What is claimed is:

1. A vertical/horizontal spindle head for machine tools comprising:

a main transmission shaft pivotally arranged on a body of a machine tool and having two ends, one end being co-axially secured to a first bevel gear thereon;

a lower rotatable housing including a main shaft, said main shaft being circumferentially and coaxially secured with a second bevel gear;

a bevel gear axle firmly secured within said lower rotatable housing and forming angles respectively with said main transmission shaft and said main shaft;

a third bevel gear and a fourth bevel gear coaxially arranged on said bevel gear axle to be rotated together and being biased by a plurality of compressed springs therebetween so that said third bevel gear can axially slide on said bevel gear axle, while maintaining an engagement of the third bevel gear with the first bevel gear;

an upper seat secured on the body of the machine tool concentrically with the bevel gear axle;

a push/pull apparatus for pushing/pulling the lower rotatable housing to move in an axial direction of the bevel gear axle between a first position where the lower rotatable housing is closest to the upper seat and a second position where the lower rotatable housing is furthest from the upper seat, said push/pull apparatus being concentric with the bevel gear axle and arranged on the upper seat;

a curved coupling including an upper curved ring and a lower curved ring respectively positioned on said upper seat and said lower rotatable housing, said upper and lower curved rings being coupled and uncoupled in said first and second positions respectively;

a slidable spline device disposed between said third bevel gear and said bevel gear axle, said slidable spline device being disengaged and engaged when the lower rotatable housing is respectively in the first and second positions;

wherein said push/pull apparatus for pushing/pulling the lower housing comprises a hydraulic device comprising:

an annular hydraulic cylinder concentric with the bevel gear axle and formed on said upper seat;

an annular piston movably arranged within said annular hydraulic cylinder;

an upper gland ring secured at an opening of said hydraulic cylinder;

a lower gland ring concentrically arranged with the bevel gear axle;

a supporting ring disposed between said upper and lower gland rings; and a plurality of supporting bolts having two ends, one end being secured to said lower gland ring and the other end being secured to said piston for mechanically connecting the lower rotatable housing to the piston.

2. The vertical/horizontal spindle head for machine tools as claimed in claim 1, wherein said supporting ring is formed with an annular groove, and said upper gland ring is formed with at least one through hole at a location corresponding to the annular groove of the supporting ring when the lower rotatable housing is in the first position, a steel ball in said through hole biased by a compressed spring and partially protruding out of the through hole.

3. The vertical/horizontal spindle head for machine tools as claimed in claim 1, wherein the bevel gear axle forms angles of 135° and 45° with said main transmission shaft and said main shaft respectively.

4. The vertical/horizontal spindle head for machine tools as claimed in claim 1, wherein said hydraulic cylinder and said piston are sealed by oil seals therebetween.

* * * * *